US012789396B2

(12) United States Patent
Sherman et al.

(10) Patent No.: US 12,789,396 B2
(45) Date of Patent: Nov. 10, 2026

(54) MAGNETICALLY RETAINED REPLACEABLE CYLINDER COMPONENT FOR PICK-AND-PLACE TEST HEAD UNIT

(71) Applicant: ADVANTEST CORPORATION, Tokyo (JP)

(72) Inventors: Patrick Sherman, San Jose, CA (US); Don Wagner, San Jose, CA (US); Moritoshi Akiya, San Jose, CA (US)

(73) Assignee: ADVANTEST CORPORATION, Tokyo (JP)

( * ) Notice: Subject to any disclaimer, the term of this patent is extended or adjusted under 35 U.S.C. 154(b) by 426 days.

(21) Appl. No.: 18/379,063

(22) Filed: Oct. 11, 2023

(65) Prior Publication Data

US 2024/0131730 A1 Apr. 25, 2024
US 2024/0227208 A9 Jul. 11, 2024

Related U.S. Application Data

(60) Provisional application No. 63/417,467, filed on Oct. 19, 2022.

(51) Int. Cl.

*B25J 15/04* (2006.01)
*B25J 15/06* (2006.01)
*B65G 47/91* (2006.01)

(52) U.S. Cl.

CPC ....... *B25J 15/0441* (2013.01); *B25J 15/0683* (2013.01); *B65G 47/91* (2013.01)

(58) Field of Classification Search

CPC .... G01R 1/0408; G01R 1/04; G01R 31/2887; G01R 31/2808

See application file for complete search history.

(56) References Cited

U.S. PATENT DOCUMENTS

2003/0222636 A1* 12/2003 Fujishiro ............ G01R 31/2893 324/750.21
2006/0097714 A1* 5/2006 Machado ........... G01R 31/2808 324/763.01

(Continued)

FOREIGN PATENT DOCUMENTS

CN 101995326 A 3/2011
CN 104891107 A 9/2015

(Continued)

OTHER PUBLICATIONS

Office Action received for Korean Application No. 10-2024-7040752 dated Aug. 30, 2025, 21 pages, (10 pages is of Translation and 11 pages of Official Copy).

(Continued)

*Primary Examiner* — Giovanni Astacio-Oquendo
*Assistant Examiner* — Temilade S Rhodes-Vivour
(74) *Attorney, Agent, or Firm* — Squire Patton Boggs LLP; Sarah Mirza

(57) ABSTRACT

Embodiments of the present invention provide a magnetically retained replaceable contact plate assembly. The magnetically retained replaceable contact plate assembly includes a contact chuck interface. The contact chuck is configured to physically mate with a device under test (DUT). The magnetically retained replaceable contact plate assembly also includes a DUT layout unit interface (DLU). The DLU is configured to couple to multiple magnetically retained replaceable contact plate assemblies and to a semiconductor handler unit. The DLU is configured to move DUTs within a test environment, and the magnetically retained replaceable contact plate assembly is configured to magnetically attach to said DLU.

20 Claims, 13 Drawing Sheets

(56) References Cited

U.S. PATENT DOCUMENTS

| | | | | |
|---|---|---|---|---|
| 2007/0200555 | A1 | 8/2007 | Mizushima et al. | |
| 2011/0128021 | A1* | 6/2011 | Chou | G01R 1/0425 324/757.02 |
| 2011/0254945 | A1 | 10/2011 | Kikuchi et al. | |
| 2015/0276860 | A1 | 10/2015 | Aizawa et al. | |
| 2016/0089792 | A1* | 3/2016 | Ojalehto | B25J 15/0441 901/50 |
| 2022/0404394 | A1* | 12/2022 | Toscano | G01R 1/0466 |

FOREIGN PATENT DOCUMENTS

| | | | |
|---|---|---|---|
| JP | 4511354 | B2 | 7/2010 |
| KR | 100580816 | | 5/2006 |
| KR | 10-2009-0076299 | A | 7/2009 |
| KR | 10-2013-0099826 | A | 9/2013 |
| KR | 1020140128517 | | 11/2014 |
| KR | 10-1556143 | B1 | 10/2015 |
| KR | 10-1588809 | B1 | 1/2016 |
| TW | 200732671 | A | 9/2007 |
| TW | 201140093 | A | 11/2011 |
| TW | I446470 | B | 7/2014 |
| TW | I700163 | B | 8/2020 |

OTHER PUBLICATIONS

Office Action received for Korean Application No. 10-2025-7043668 dated Aug. 17, 2026, 8 pages.

* cited by examiner

MAGNETICALLY RETAINED REPLACEABLE CYLINDER COMPONENT FOR PICK-AND-PLACE TEST HEAD UNIT

RELATED APPLICATIONS

This application claims benefit of, and priority to U.S. Provisional Application Ser. No. 63/417,467 filed Oct. 19, 2022 to Sherman et al., which is hereby incorporated herein by reference in its entirety.

FIELD OF INVENTION

Embodiments of the present invention relate to the field of integrated circuit manufacturing and testing. More specifically, embodiments of the present invention relate to systems and methods for testing integrated circuit products utilizing automated robotic transport and handling mechanisms including pick-and-place machines and/or robots.

BACKGROUND

It is common to subject integrated circuits, either packaged or unpackaged, to environmental and electronic testing as an operation in a manufacturing processes. Typically in such testing, the integrated circuit devices are subject to electrical testing, e.g., "test patterns," to confirm functionality while contemporaneously being subjected to environmental stress. For example, an integrated circuit is heated and/or cooled to its specification limits while being electrically tested. In some cases, e.g., for qualification testing, an integrated circuit may be stressed beyond its specifications, for example, to determine failure points and/or establish "guard band" on its environmental specifications.

Traditionally, such testing has included placing one or more integrated circuits and their associated test interface(s) and support hardware into an environmental chamber or other tester. The environmental chamber would heat and/or cool the integrated circuit(s) under test, known as or referred to as a device under test, or "DUT," as well as subject the test interface and support hardware, to the desired test temperature.

Some testing systems employ automated robot handlers to move the integrated circuits from a source "tray" or "plate" to the tester and test environment. These handlers often utilize pick-and-place heads that grab and move the integrated circuit under test. The pick-and-place head is also called a "pad" unit or "pad" head.

FIG. 1 shows a prior art pick-and-place head 10 including a cylinder portion 14 locked via bolt 16 to the block portion 12 which mates with the handler (not shown). Bolts 18 and 16 secure the pieces with bolt 18 attaching to the handler. The pad head 10 is typically oriented downward during use with suction cup 25 pointing down to mate with and grab a DUT. This cylinder 14 requires change out to match the physical characteristics of the DUT, so the cylinder needs to be changed frequently, e.g., for every different type of DUT. Handlers often contain an array of pad heads, e.g., x16, so each swap-out requires multiple heads to be changed. When installed in the handler, the head 10 does not have much clearance between the bottom of the suction cup 25 and the tray or plate on which the DUTs are sourced. This low clearance amount coupled with cylinder 14 being fixed to block portion 12 via bolt 16, makes change out of cylinder 14 very difficult for the technician. Oftentimes due to such difficulties, a technician may change out an entire pad unit 10, e.g., via bolt 18, rather than changing only the cylinder unit 14. It would be advantageous to provide a more effective and easy way to change out the cylinder portion of the pick-and-place head 10.

SUMMARY OF THE INVENTION

Accordingly, embodiments of the present invention provide a magnetically retained replaceable contact plate assembly. The magnetically retained replaceable contact plate assembly includes a contact chuck interface. The contact chuck is configured to physically mate with a device under test (DUT). The magnetically retained replaceable contact plate assembly also includes a DUT layout unit interface (DLU). The DLU is configured to couple to multiple magnetically retained replaceable contact plate assemblies and to a semiconductor handler unit. The DLU is configured to move DUTs within a test environment, and the magnetically retained replaceable contact plate assembly is configured to magnetically attach to the DLU.

In accordance with an embodiment of the present invention, a pick and place test head includes a block component for physically or electrically mating with a handler of a testing system, wherein the block component includes a first interface area comprising: a recessed collar; and a first plurality of magnets, and a removeable cylinder component operable to be removeably attached to the block component. The removeable cylinder component is operable to attach to and pick up an integrated circuit device under test and includes a second interface area includes an extruded collar and a second plurality of magnets, wherein the removeable cylinder component and the block component securely attach upon the first and second interface areas being brought into close proximity thereto and under magnetic forces from the first and second plurality of magnets.

Embodiments include the above and further include wherein the removeable cylinder component further includes a pneumatically controlled piston, and a suction cup coupled to one end of the piston. This suction cup is for attaching to and securing the integrated circuit device under test.

Embodiments include the above and further include wherein the recessed collar and the extruded collar mate upon the removeable cylinder component and the block component securely attaching together.

Embodiments include the above and further include wherein the removeable cylinder component is operable to be removed from the block component when securely attached thereto by means of manual force and manual operation without use of any tools.

Embodiments include the above and further include wherein the means of manual operation includes a rotation of the removeable cylinder component with respect to the block component.

Embodiments include the above and wherein the magnetically retained replaceable contact plate assembly further includes a vacuum port to pass a vacuum from the DLU to the contact chuck for retention of the DUT.

Embodiments include the above and wherein the magnetically retained replaceable contact plate assembly is further configured to provide compliance between positioning of the contact chuck to the DLU.

Embodiments include the above and wherein the magnetically retained replaceable contact plate assembly is further configured to conduct thermal energy from the contact chuck to the DLU.

Embodiments include the above and wherein the magnetically retained replaceable contact plate assembly is further configured to be attached to the DLU without use of tools.

Embodiments include the above and wherein the magnetically retained replaceable contact plate assembly is further configured to apply a force to the contact chuck to retain the DUT in a socket.

In accordance with another embodiment of the present invention, a tester system for testing integrated circuit devices under test (DUTs), the tester system includes a computerized tester for applying test vectors to the DUTs and for analyzing results therefrom. The tester system also includes an automated robotic handler for automatically moving the DUTs to the tester from a source tray, a contact chuck operable to attach to and pick up a DUT of the DUTs from the source tray, and a magnetically retained replaceable contact plate assembly configured to securely couple to the contact chuck. The magnetically retained replaceable contact plate assembly is configured to magnetically couple to the automated robotic handler.

Embodiments include the above and wherein the contact chuck is configured to utilize a vacuum provided by the automated robotic handler through the magnetically retained replaceable contact plate assembly to retain the DUT.

Embodiments in accordance with the present invention include a tester system for testing integrated circuit devices under test (DUTs), the tester system including a computerized tester for applying test vectors to the DUTs and for analyzing results therefrom, an automated robotic handler for automatically moving the DUTs to the tester from a source tray, and a pick and place test head securely coupled to the automated robotic handler, the pick and place test head operable to attach to and pick up a DUT of the DUTs from the source tray. The pick and place test head includes a block component for physically mating with the automated robotic handler, wherein the block component includes a first interface area including a recessed collar, a first plurality of magnets; and a removeable cylinder component operable to be removeably attached to the block component. The removeable cylinder component includes a second interface area comprising: an extruded collar and a second plurality of magnets, wherein the removeable cylinder component and the block component securely attach upon the first and second interface areas being brought into close proximity thereto and under magnetic forces from the first and second plurality of magnets.

Embodiments include the above and further include a pneumatically controlled piston, and a suction cup coupled to one end of the piston, the suction cup for attaching to and securing the integrated circuit device under test.

Embodiments include the above and further include wherein the recessed collar and the extruded collar mate upon the removeable cylinder component and the block component securely attaching together.

Embodiments include the above and further include wherein the removeable cylinder component is operable to be removed from the block component when securely attached thereto by means of manual force and manual operation without use of any tools.

Embodiments include the above and further include wherein the means of manual operation includes a rotation of the removeable cylinder component with respect to the block component.

Embodiments in accordance with the present invention include a pick and place test head including a block component plate for physically mating with a handler of a testing system in a removable fashion, wherein the block component plate includes an interface area for remove ably coupling to the handler and wherein the interface area includes a first plurality of magnets, and an array of cylinder components operable to be affixedly attached to the block component plate and wherein each cylinder component of the array is operable to attach to and pick up an respective integrated circuit device under test, wherein the block component plate and the handler securely attach upon the interface area of the plate being brought into close proximity to the handler and under magnetic forces therefrom.

Embodiments in include the above and further include wherein each cylinder component of the array further includes a pneumatically controlled piston and a suction cup coupled to one end of the piston, the suction cup for attaching to and securing the integrated circuit device under test.

Embodiments in include the above and further include a first plate and a second plate wherein the first plate is operable to mate with the array and wherein the second plate is operable to removeably mate with the handler and includes magnets and orientation features, and distribution features for distributing pneumatic pressure to each cylinder component of the array.

In accordance with another embodiment of the present invention, a pick and place test head includes a block unit configured to mate with a test system handler, and a removable cylinder component configured to removably mate with the block unit and configured to securely retain a device under test, wherein the removable cylinder is magnetically attached to the block unit.

Embodiments in include the above and further include wherein the removable cylinder component is configured to rotate into a locking configuration secured by a feature of the block unit.

Embodiments in include the above and further include wherein both the block unit and the removable cylinder component include retention magnets.

In accordance with a method embodiment of the present invention, a method of changing a cylinder component of a pick and place head includes first rotating a first cylinder component of a pick and place head to unlock the first cylinder component of a pick and place head without using tools, removing the first cylinder component of a pick and place head from a block unit placing a second cylinder component of a pick and place head against the block unit, and second rotating the second cylinder component of a pick and place head into a locking position in alignment with the block unit.

Embodiments in include the above and further include wherein the first rotating unaligns retention magnets of the pick and place head.

Embodiments in include the above and further include wherein the second rotating aligns retention magnets of the pick and place head to secure the second cylinder component to the block unit.

In accordance with another embodiment of the present invention, a pick and place test head system includes a block component, a first cylinder component configured to be removed from the block component using manual force and without using tools, and a second cylinder component configured to be attached to the block component using manual force and without using tools.

Embodiments in include the above and further include wherein removing said first cylinder component comprises rotating said first cylinder component.

Embodiments in include the above and further include wherein attaching said first cylinder component comprises rotating said second cylinder component into a locking position on the block component.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, dimensions are exemplary and the drawings may not be drawn to scale.

DETAILED DESCRIPTION

Figure 1:
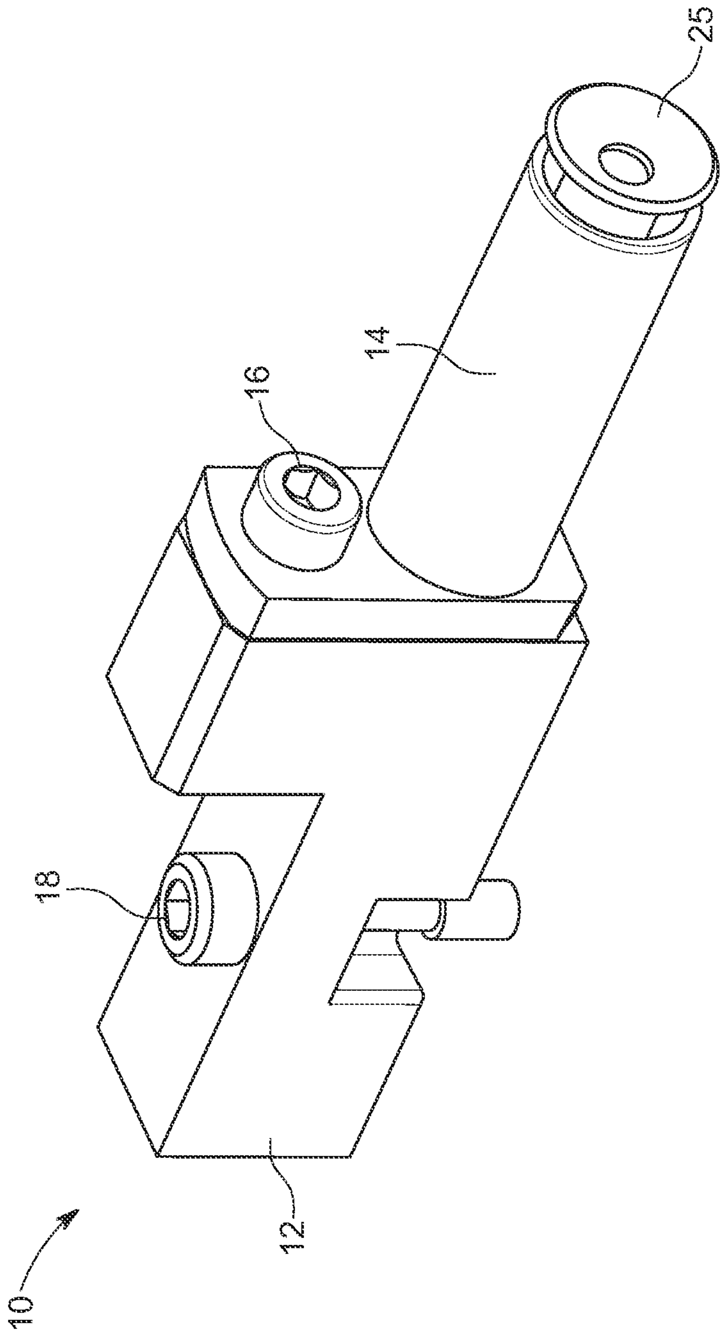
FIG. 1 illustrates a prior art pick and place test head where the cylinder component is securely attached to the block component with a bolt.

Reference will now be made in detail to various embodiments of the invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions which follow are presented in terms of procedures, steps, logic blocks, processing, and other symbolic representations of operations on data bits that may be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, data, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "testing" or "heating" or "maintaining temperature" or "bringing" or "capturing" or "storing" or "reading" or "analyzing" or "generating" or "resolving" or "accepting" or "selecting" or "determining" or "displaying" or "presenting" or "computing" or "sending" or "receiving" or "reducing" or "detecting" or "setting" or "accessing" or "placing" or "testing" or "forming" or "mounting" or "removing" or "ceasing" or "stopping" or "coating" or "processing" or "performing" or "generating" or "adjusting" or "creating" or "executing" or "continuing" or "indexing" or "translating" or "calculating" or "measuring" or "gathering" or "running" or the like, refer to the action and processes of, or under the control of, a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The meaning of "non-transitory computer-readable medium" should be construed to exclude only those types of transitory computer-readable media which were found to fall outside the scope of patentable subject matter under 35 U.S.C. § 101 in *In re Nuijten,* 500 F.3d 1346, 1356-57 (Fed. Cir. 2007). The use of this term is to be understood to remove only propagating transitory signals per se from the claim scope and does not relinquish rights to all standard computer-readable media that are not only propagating transitory signals per se.

Figure 2:
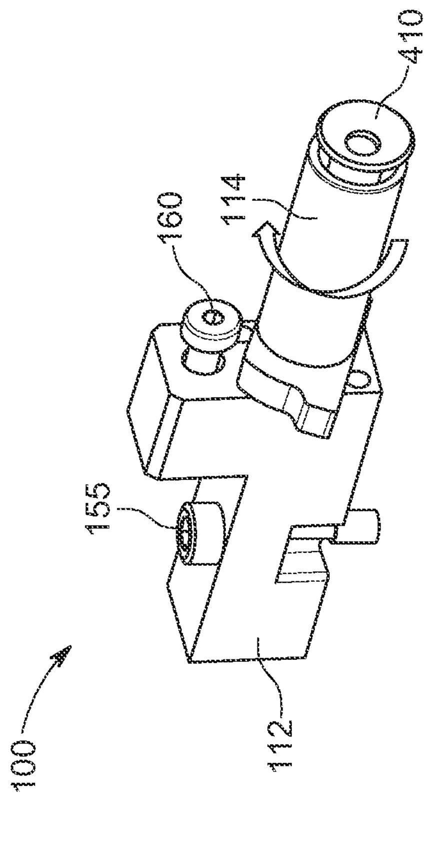
FIGS. 2, 3, 4, and 5 illustrate an exemplary test head in accordance with embodiments of the present invention where the cylinder part is being rotated to readily lock and unlock the cylinder portion from the block portion without use of tools.

Magnetically Retained Replaceable Cylinder Component for Pick-and-Place Test Head Unit FIG. 2 illustrates an exemplary embodiment of the pick-and-place (PNP) test head 100 in accordance with the present invention. The test head 100 comprises a block component 112 removeably coupled to a removeable cylinder component 114. Bolt 155 securely couples the head 100 to a robotic handler (not shown). Typically, the robotic handler moves the test head in X and Y directions to place the test head 100 over a device under test ("DUT"). Within cylinder 114 is a pneumatically controlled piston and coupled to one end of the piston is suction cup 410 for mating with and securely attaching to an integrated circuit device under test (DUT). Bolt 160 is optional and acts as a secondary retention device for the cylinder component 114 to the block component 112. As shown in FIG. 2, the cylinder component 114 is inserted into the block component 112 and rotated to securely attach or lock thereto. For example, the rotation causes a number of magnets, further described below with respect to FIGS. 3, 5, 6A, and 6B, to be aligned, providing a retention force to hold the cylinder component 114 to the block component 112. The illustrated direction of rotation, e.g., clockwise, for attachment is exemplary. Magnets installed on component 112 and also on component 114 provide the attachment force between these two parts when the parts are rotated into alignment.

In accordance with embodiments of the present invention, a decreased number of magnets may be aligned prior to rotation for attachment and/or after rotation for removal. Such a decreased number of magnets may provide a lesser retention force as an aid to positioning the cylinder component, e.g., so that the cylinder component does not fall away prior to rotation into its final "locked" position.

In accordance with embodiments of the present invention, the cylinder component 114 to the block component 112 may comprise non-magnetic materials. In accordance with embodiments of the present invention, the cylinder component 114 to the block component 112 may comprise materials that are resistant to corrosion. Exemplary materials include, for example, austenitic (non-magnetic) stainless steel and/or aluminum.

Figure 3:
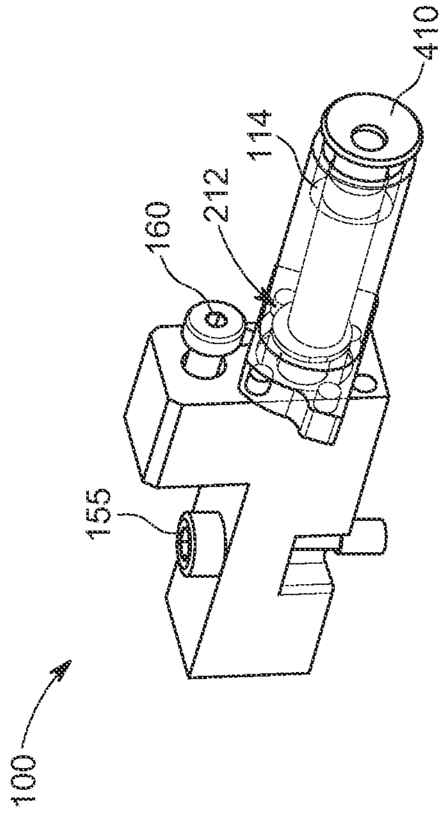

FIG. 3 illustrates an exemplary cut away view of the interface between block 112 and cylinder 114 components of the PNP test head 100, in accordance with embodiments of the present invention. This interface comprises a plurality, e.g., 4, of magnets 212 that provide a securing force between the components when the parts are aligned.

Figure 4:
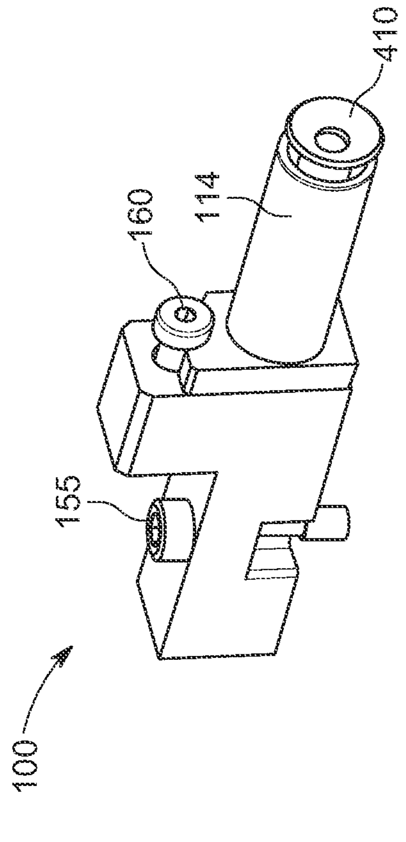

FIG. 4 illustrates an exemplary assembled PNP test head 100, in accordance with embodiments of the present invention.

Figure 5:
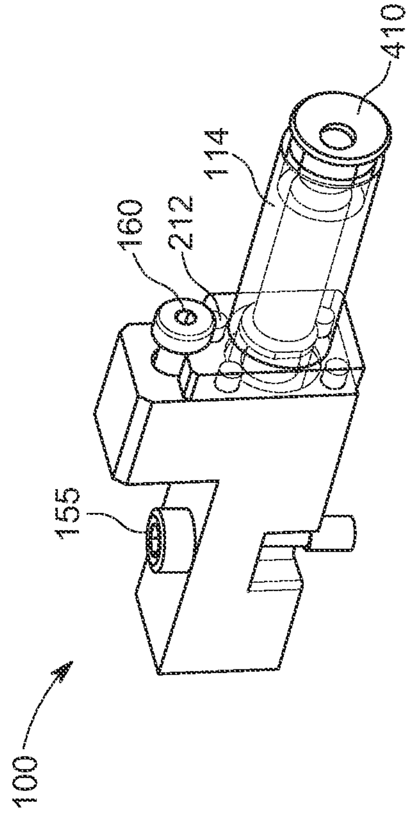

FIG. 5 illustrates an exemplary cut away view of the interface between block 112 and cylinder 114 components as assembled and aligned with the magnets of the block's interface aligned with the magnets of the cylinder's interface, in accordance with embodiments of the present invention. In this arrangement, a simple manual twist and manual pull of the cylinder component 114 easily removes the cylinder component 114 from the block component 112 for replacement of component 114. No tools or special equipment are needed to perform the removal or the installation of the cylinder component 114 to the block component 112. Manual force and operation are all that is required for installation and removal of the cylinder component 114.

Figure 6A:
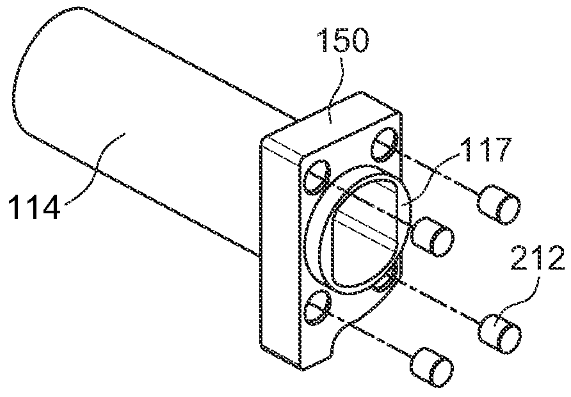
FIGS. 6A and 6B illustrate exemplary magnets and their locations on a plate surrounding a collar indent on the cylinder portion of the pick and place test head, in accordance with embodiments of the present invention.
Figure 6B:
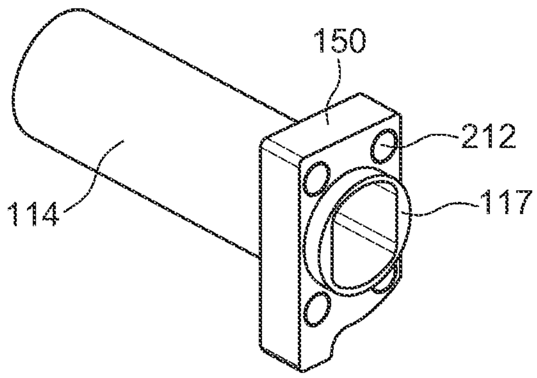

FIGS. 6A and 6B illustrate exemplary exploded and assembled views, respectively, of the attachment interface end of the removeable cylinder component 114 exposing the magnets 212 installed therein, in accordance with embodiments of the present invention. Although any number of magnets can be used, 4 are shown as an example only. Also shown is an exemplary extruded collar 117 in which contains a pneumatic controlled piston. Magnets 212 are installed inside interface plate 150.

Figure 7A:
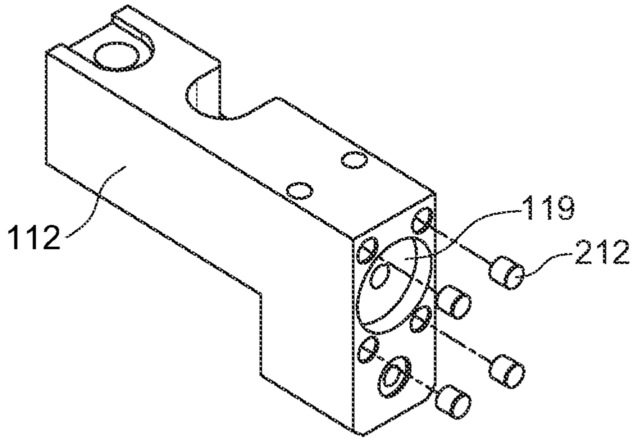
FIGS. 7A and 7B illustrate exemplary magnets and their locations on a plate surrounding a collar on the block portion of the pick and place test head, in accordance with embodiments of the present invention.
Figure 7B:
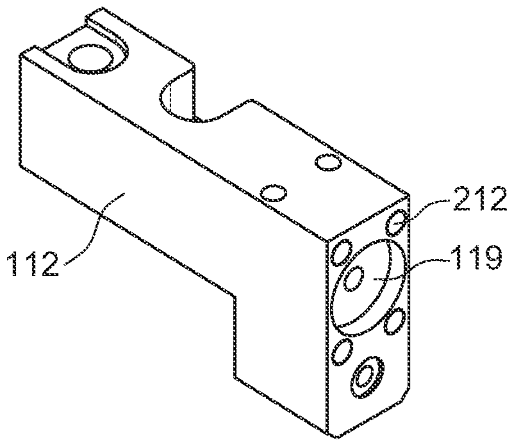

FIGS. 7A and 7B illustrate exploded and assembled views, respectively, of the exemplary attachment interface end of the block component 112 exposing the magnets 212 installed therein, in accordance with embodiments of the present invention. Although any number of magnets can be used, 4 are shown as an example only. Also shown is an inset or recessed collar 119 which mates with extruded collar 117 (FIG. 6A).

Figure 8:
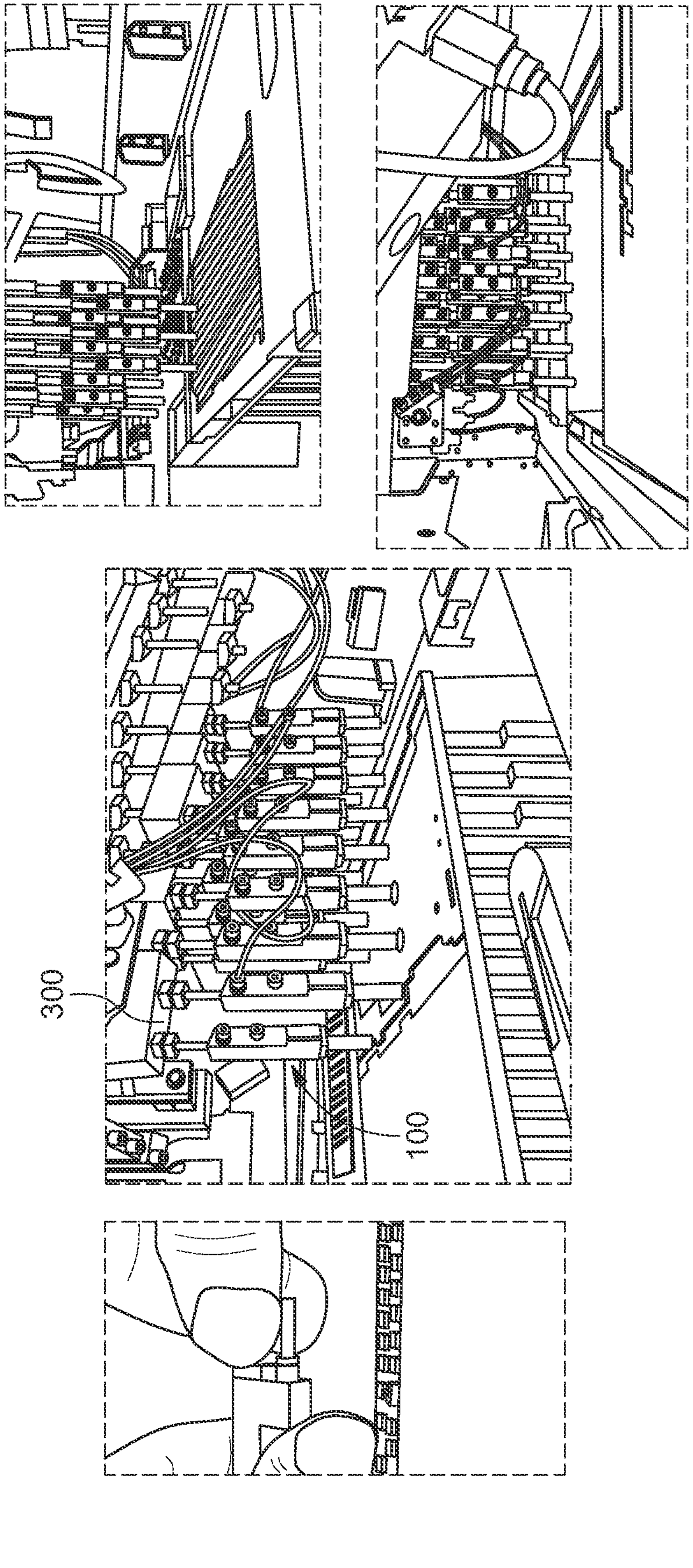
FIG. 8 illustrates an exemplary test head of embodiments of the present invention installed in a handler of a testing system having automated handling mechanisms.

FIG. 8 illustrates an exemplary handler 300 with a plurality of individual PNP test heads 100 installed thereon arranged in an array of heads, in accordance with embodiments of the present invention. As shown installed on the handler 300, the cylinder component of each test head is pointing downward.

Figure 9B:
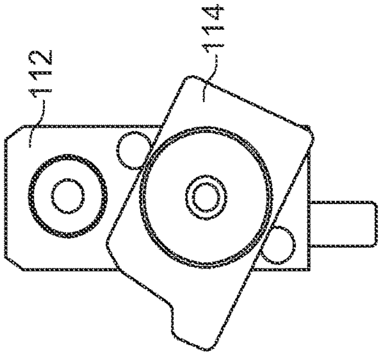
FIG. 9B and FIG. 9C illustrate an exemplary manual rotation method used to install and remove the cylinder part to and from the block part of the test head of embodiments of the present invention without needing any tool or other mechanism.
Figure 9C:
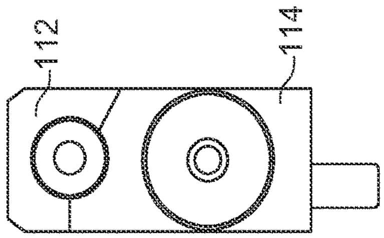
Figure 9A:
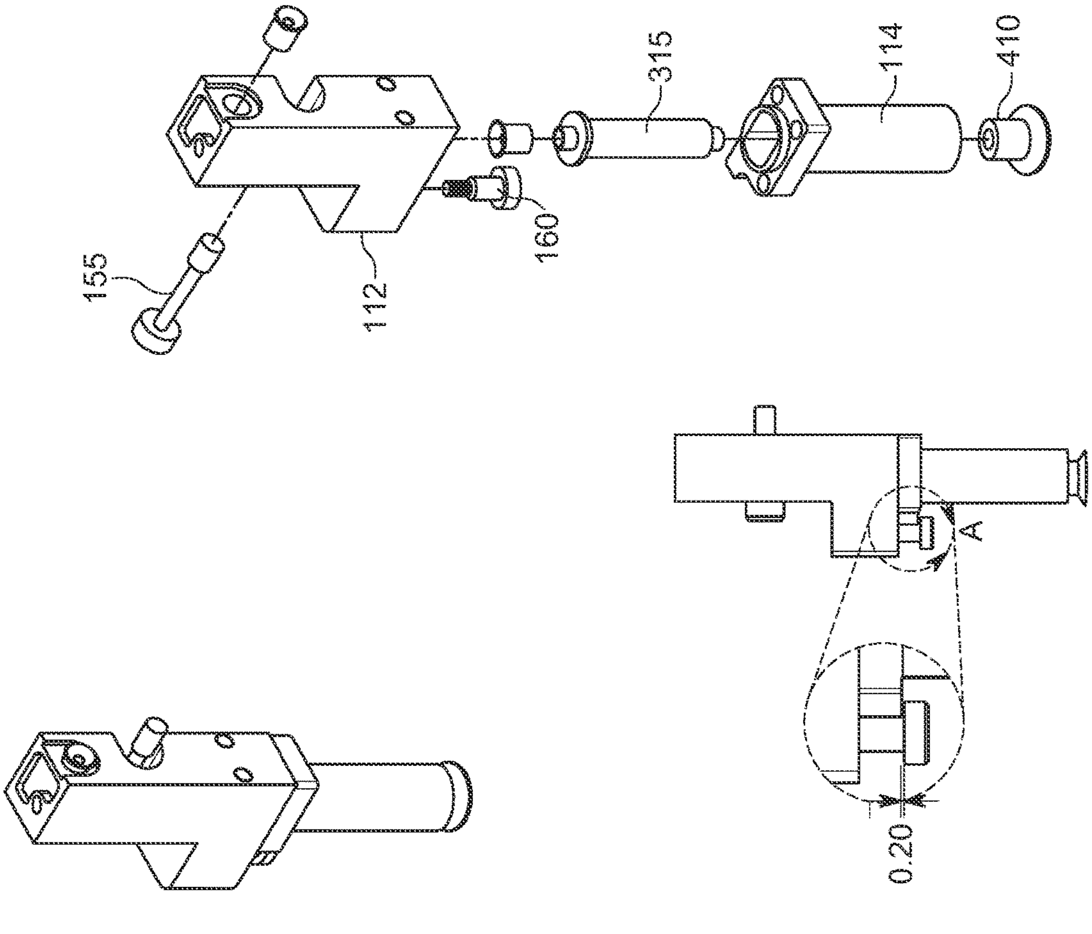
FIG. 9A illustrates an exemplary exploded view of the components of the block part and cylinder part of the test head in accordance with embodiments of the present invention in more detail.

FIG. 9A is an exemplary exploded view of the test head 100 in accordance with an embodiment of the present invention. Bolt or screw 155 is used to secure the test head 100 to the handler 300. Block component 112 is shown. Also shown is pneumatically controlled piston 315 which is controlled by air pressure supplied from the handler 300 and through the block component 112. Optional secondary retention device 160 is also shown. Piston 315 sits inside cylinder component 114. Also shown is the suction cup 410 which is assembled on one end of piston 315.

FIG. 9B and FIG. 9C illustrate exemplary twisting of the cylinder component 114 for installation and removal from the block component 112, in accordance with embodiments of the present invention.

Figure 10C:
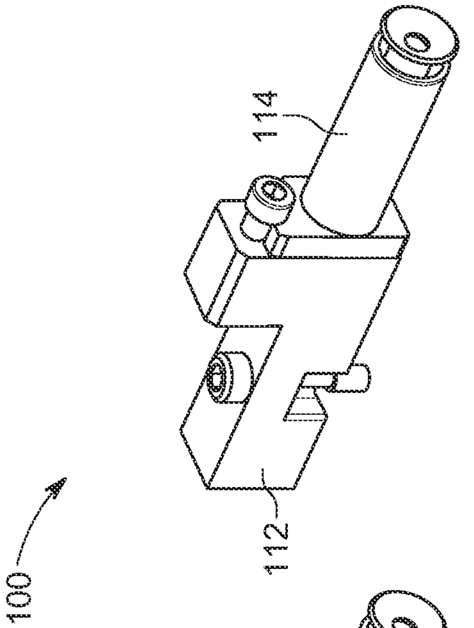
FIG. 10B and FIG. 10C illustrate an exemplary PNP test head in accordance with embodiments of the present invention.
Figure 10B:
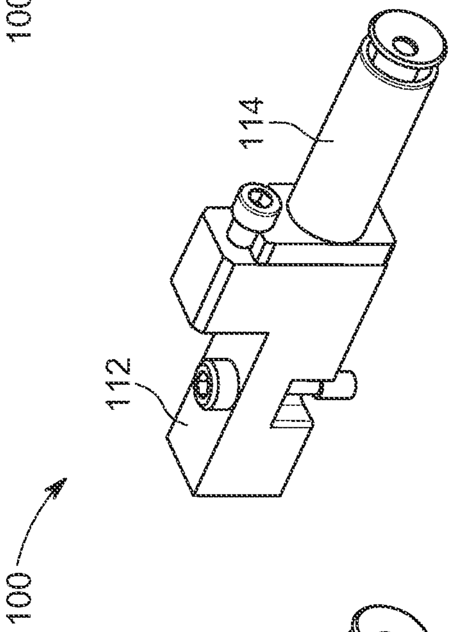
Figure 10A:
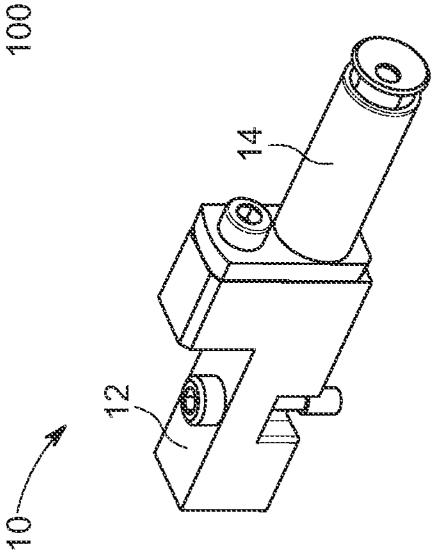
FIG. 10A illustrates a prior art design PNP head.

FIG. 10A, FIG. 10B and FIG. 10C illustrate that the cylinder component is swapped out routinely to accommodate different sized DUTs. In the prior art component shown in FIG. 10A, the test unit operator would replace the entire test head 10 in order to change the size of the suction cup used. In an exemplary x16 pad unit system, the system utilizes 16 loader and 16 unloader PNP heads or '"pad" units, meaning 32 screws to be uninstalled and re-installed during the change-over. As shown in FIG. 10C, using the embodiments of the present invention, when a test unit operator needs to swap the PNP test head to a different size, only the cylinder assembly 114 is swapped out. Meaning, the test unit operator only needs to purchase pad unit cylinder assemblies when swapping for PNP head unit size. The exchange of PNP units is completely tool-less. For instance, on the same x16 system, the technician will take less than ⅓ the time to swap the magnetic pad units because there are no screws involved in the swap.

Figure 11:
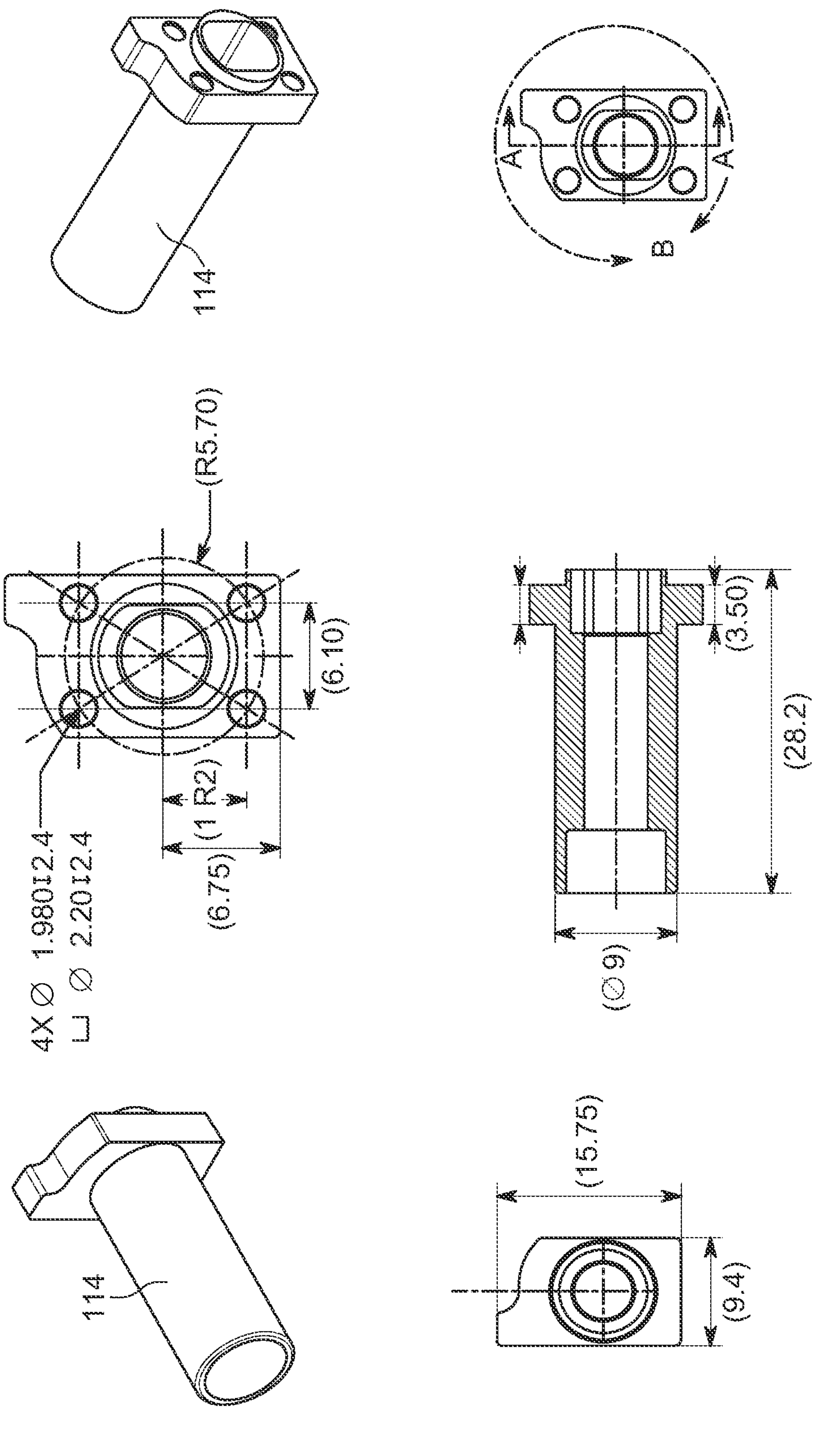
FIG. 11 illustrates detailed exemplary schematic drawings of the cylinder part of the PNP test head in accordance with embodiments of the present invention.
Figure 12:
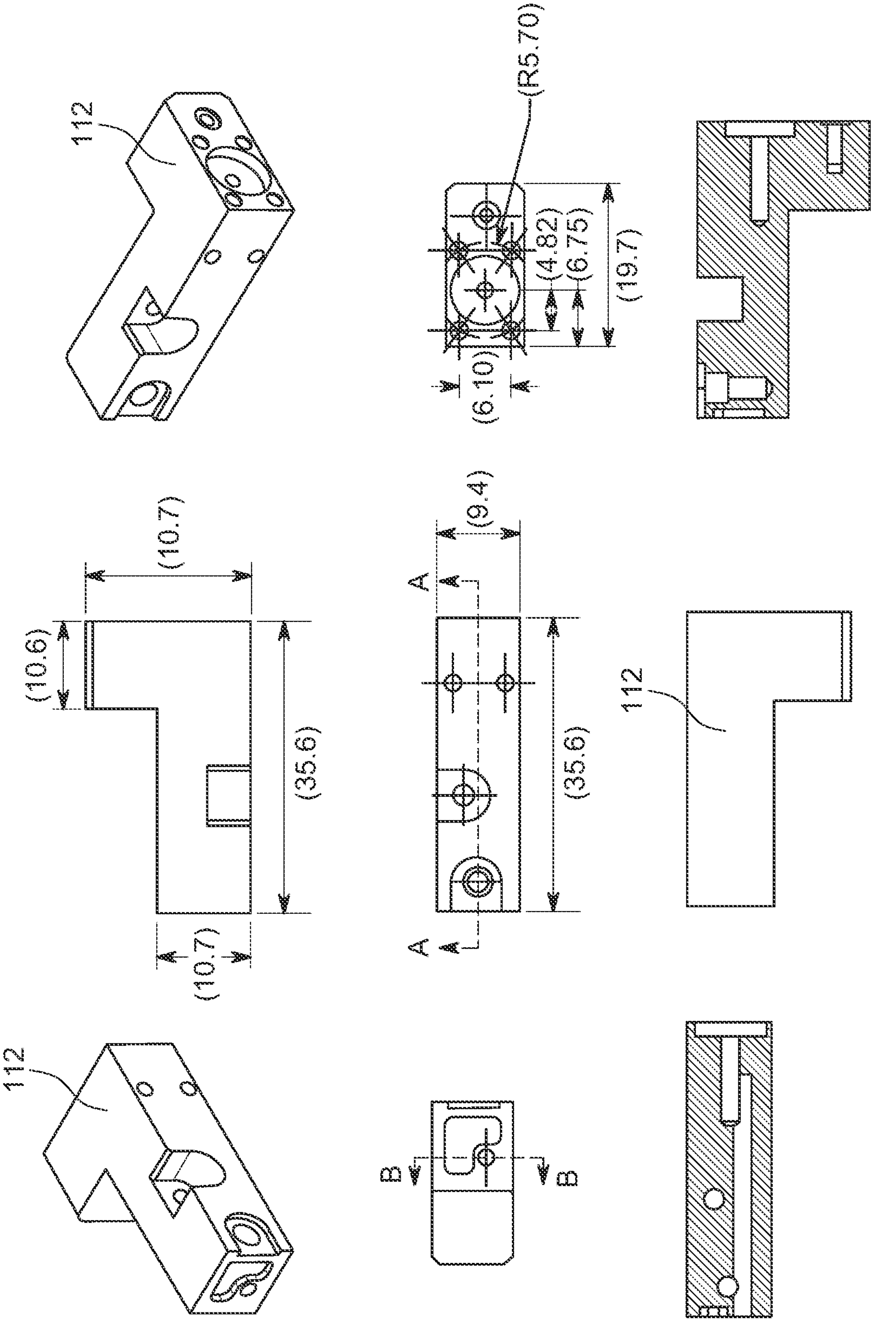
FIG. 12 illustrates detailed exemplary schematic drawings of the block part of the PNP test head in accordance with embodiments of the present invention.

FIG. 11 illustrates exemplary schematic designs for the replaceable cylinder component 114, in accordance with embodiments of the present invention. FIG. 12 illustrates exemplary schematic designs for the block component 112, in accordance with embodiments of the present invention.

Figure 13A:
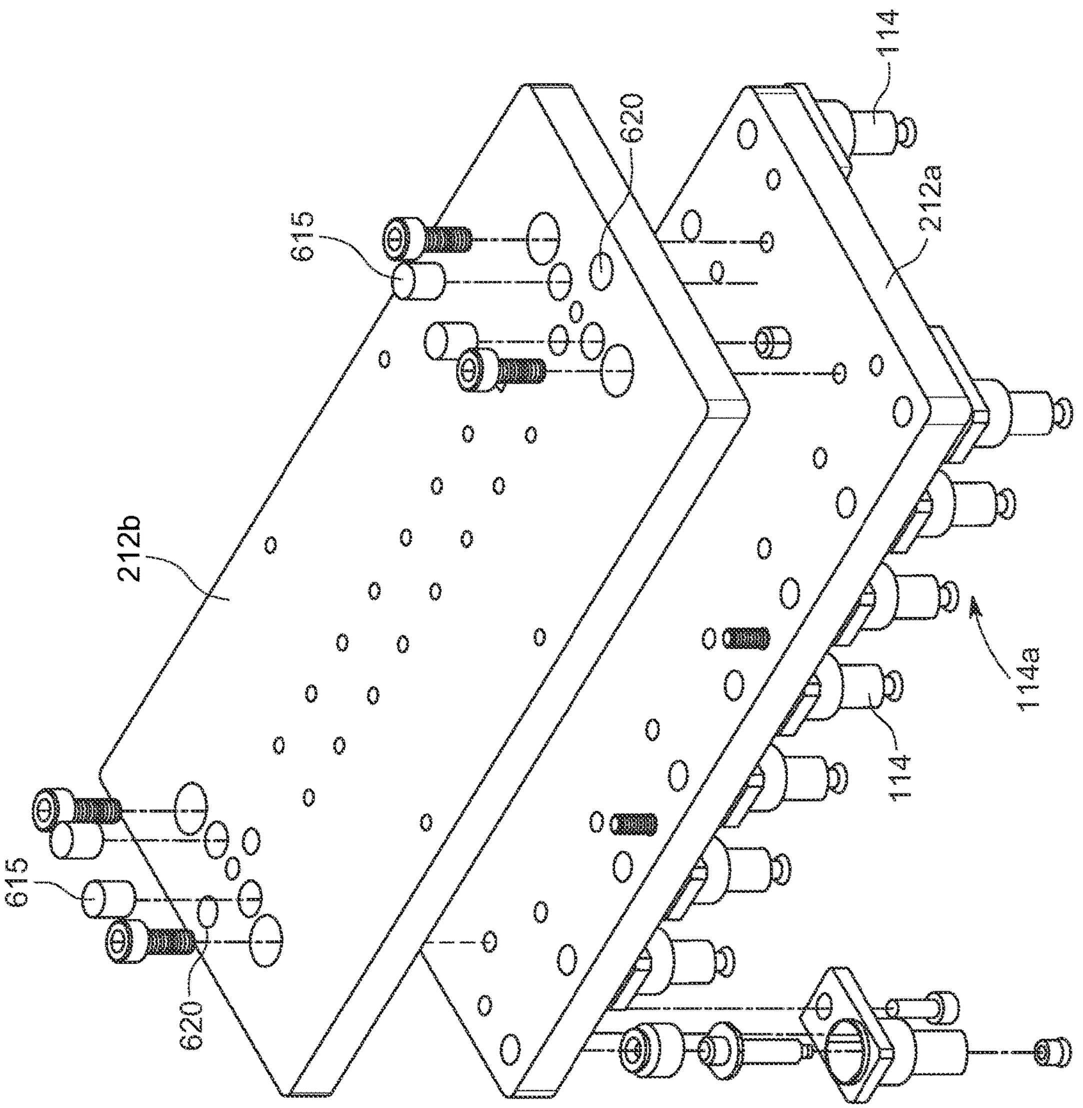
FIG. 13A illustrates a top perspective view of another embodiment of the present invention in which a 2-dimensional array of cylinder parts are affixed to a common block "plate" and the block plate is magnetically attached to the handler system.

FIG. 13A illustrates another embodiment of the present invention in which an array of cylinder parts 114*a* are affixed to a common block "plate" (212*a* and 212*b*) and the plate is magnetically attached to the handler system. The plate "212*ab*" is assembled via two plates 212*a* and 212*b* as shown. The embodiment facilitates quick replacement of the entire array 114*a* of cylinder parts 114 simultaneously with the switch-out of the common plate to which they are all connected. As shown in top perspective view, an array of cylinder parts 114*a* are each individually affixed to common block plate 212*a* which mates with top plate 212*b*. Common block plate 212*ab* provides to each cylinder part, respectively, all the functions of the single block part 112 (see FIG. 9A for instance), see pass through features 715 of FIG. 13C for this distribution mechanism. Magnets 615 FIG. 13A mounted on the top plate 212*b* are used to couple the assembled common block plate 212*ab* to the handler system with alignment features 620 helping with orientation and alignment to the handler. Common block plate 212*ab* can be separated from the handler system with a slight pull downward of about 2 lbs pressure or more. This action effectively removes the entire array of cylinder parts 114*a* from the system simultaneously and is efficient for maintenance and reconfiguration operations of the tester.

Figure 13B:
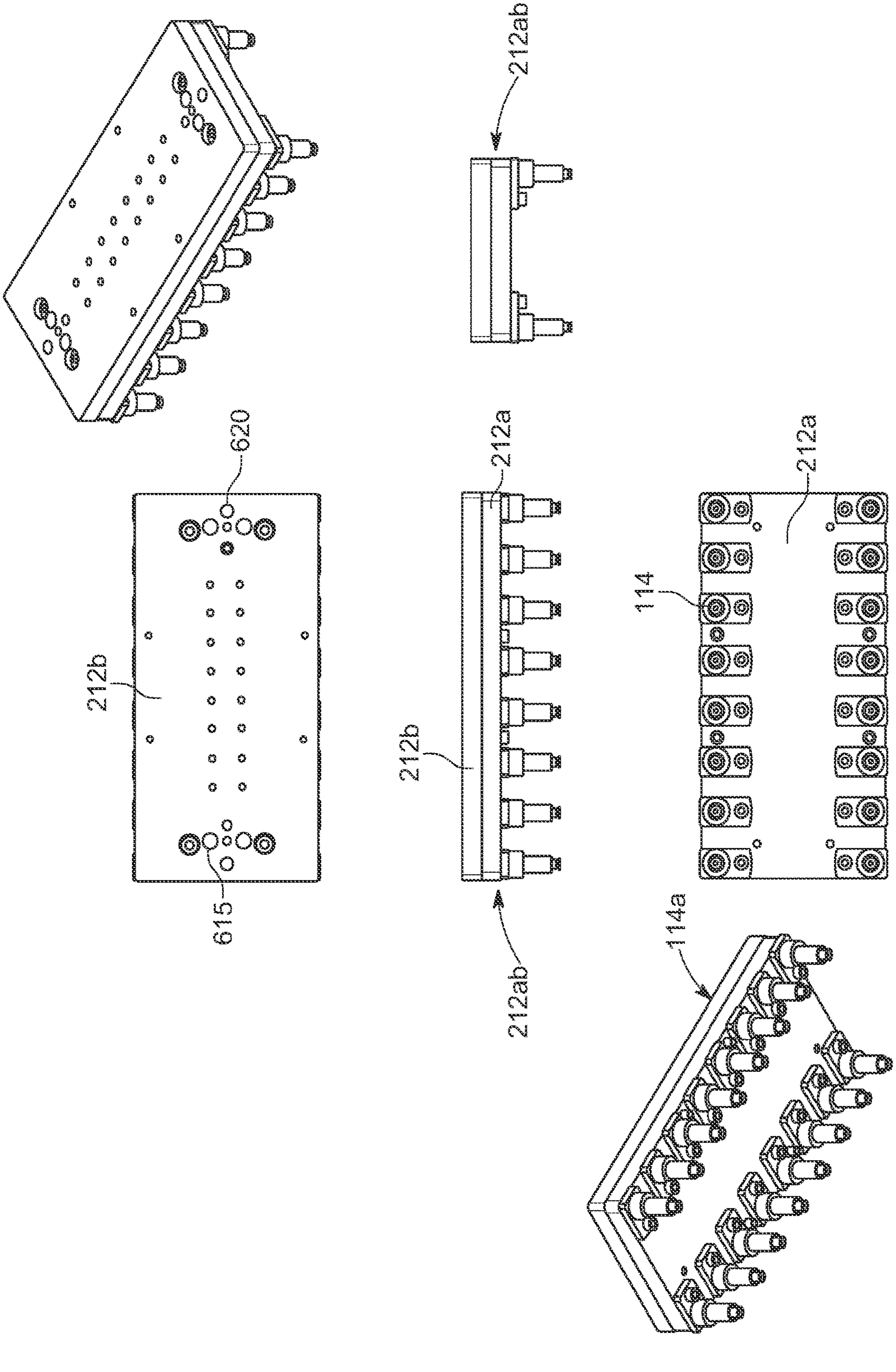
FIG. 13B illustrates a bottom perspective view of another embodiment of the present invention in which a 2-dimensional array of cylinder parts are affixed to a common block "plate" and the block plate is magnetically attached to the handler system.

FIG. 13B illustrates top and bottom perspective views of the assembled plate embodiment of FIG. 13A.

Figure 13C:
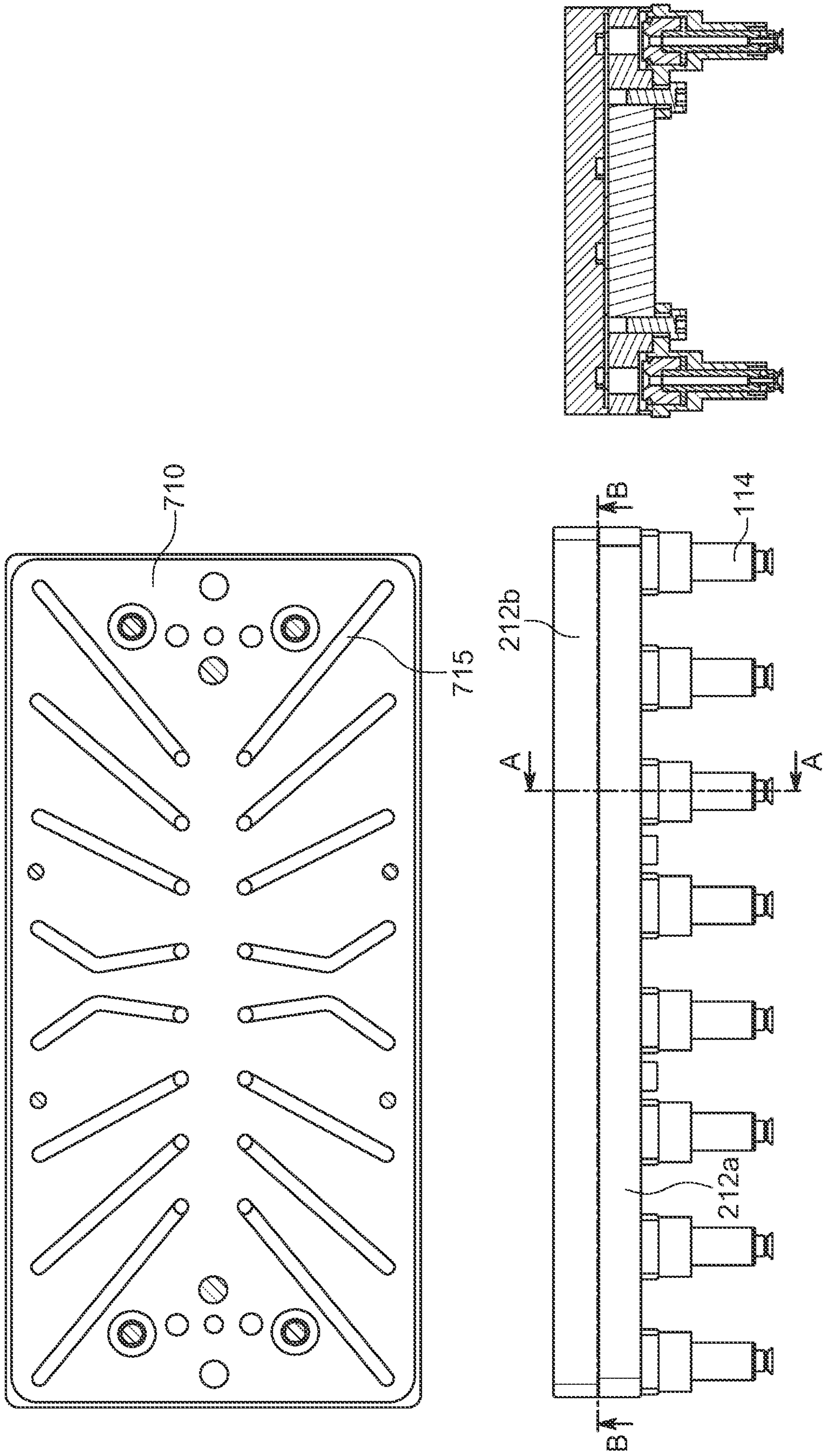
FIG. 13C illustrates the inner features of the block plate part of the embodiment of FIG. 13A.

FIG. 13C illustrates the distribution features within the common block plate of the embodiment of FIG. 13A.

Figure 13D:
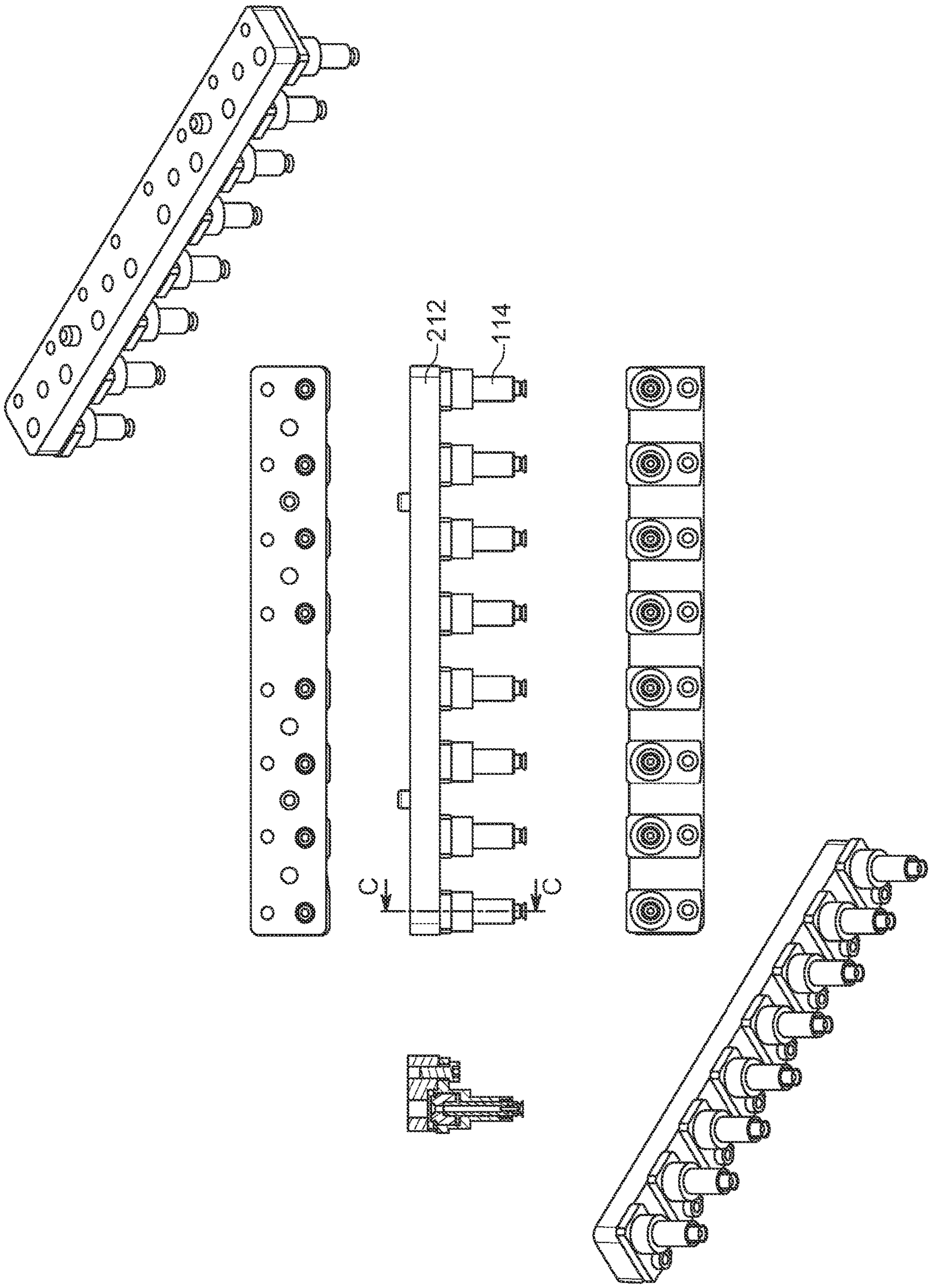
FIG. 13D illustrates a top and bottom perspective view of another embodiment of the present invention in which a 1-dimensional array of cylinder parts are affixed to a common block "plate" and the block plate is magnetically attached to the handler system.

FIG. 13D illustrates an embodiment similar to FIG. 13A but having a single array of cylinder parts per removable common block plate.

Embodiments in accordance with the present invention provide systems and methods for replaceable cylinder component in PNP test head utilizing magnetic force coupling. Although the invention has been shown and described with respect to a certain exemplary embodiment or embodiments, equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

Various embodiments of the invention are thus described. While the present invention has been described in particular embodiments, it should be appreciated that the invention should not be construed as limited by such embodiments, but rather construed according to the below claims.

We claim:

1. A pick and place test head comprising:

a block component for physically or electrically mating with a handler of a testing system, wherein said block component comprises a first interface area comprising: a recessed collar; and a first plurality of magnets; and a removeable cylinder component operable to be removeably attached to said block component and wherein said removeable cylinder component is operable to attach to and pick up an integrated circuit device under test and comprises a second interface area separable from the first interface area, the removeable cylinder component comprising:

an extruded collar and a second plurality of magnets, wherein said removeable cylinder component and said block component securely attach upon said first interface area and said second interface area being brought into close proximity with each other and under magnetic forces from said first plurality of magnets and said second plurality of magnets.

2. The pick and place test head of claim 1 wherein said removeable cylinder component further comprises:

a pneumatically controlled piston; and a suction cup coupled to one end of said piston, said suction cup for attaching to and securing said integrated circuit device under test.

3. The pick and place test head of claim 1 wherein the recessed collar and the extruded collar mate upon said removeable cylinder component and said block component securely attaching together.

4. The pick and place test head of claim 3 wherein said removeable cylinder component is operable to be removed from the block component when securely attached thereto by means of manual force and manual operation without use of any tools.

5. The pick and place test head of claim 3 wherein said means of manual operation comprises a rotation of said removeable cylinder component with respect to said block component.

6. A tester system for testing integrated circuit devices under test (DUTs), said tester system comprising:

a computerized tester for applying test vectors to said DUTs and for analyzing results therefrom;

an automated robotic handler for automatically moving said DUTs to said tester from a source tray; and a pick and place test head securely coupled to said automated robotic handler, said pick and place test head operable to attach to and pick up a DUT of said DUTs from said source tray, wherein said pick and place test head comprises:

a block component for physically mating with said automated robotic handler, wherein said block component comprises a first interface area comprising: a recessed collar; and a first plurality of magnets; and a removeable cylinder component operable to be removeably attached to said block component and operable to attach to and pick up the DUT, wherein said removeable cylinder component comprises a second interface area separable from the first interface area, the removeable cylinder component comprising:

an extruded collar and a second plurality of magnets, wherein said removeable cylinder component and said block component securely attach upon said first interface area and said second interface area being brought into close proximity with each other and under magnetic forces from said first plurality of magnets and said second plurality of magnets.

7. The tester system of claim 6 wherein said removeable cylinder component further comprises:

a pneumatically controlled piston; and a suction cup coupled to one end of said piston, said suction cup for attaching to and securing said integrated circuit device under test.

8. The tester system of claim 6 wherein the recessed collar and the extruded collar mate upon said removeable cylinder component and said block component securely attaching together.

9. The tester system of claim 8 wherein said removeable cylinder component is operable to be removed from the block component when securely attached thereto by means of manual force and manual operation without use of any tools.

10. The tester system of claim 8 wherein said means of manual operation comprises a rotation of said removeable cylinder component with respect to said block component.

11. A pick and place test head comprising:

a block component plate for physically mating with a handler of a testing system in a removeable fashion, wherein said block component plate comprises an interface area for removeably coupling to the handler and wherein the interface area comprises a first plurality of magnets; and an array of cylinder components operable to be affixedly attached to said block component plate and wherein each cylinder component of said array is operable to attach to and pick up a respective integrated circuit device under test, wherein said block component plate and said handler securely attach upon said interface area of said plate being brought into close proximity to said handler and under magnetic forces therefrom, wherein the block component plate comprises: a first plate and a second plate wherein the first plate is operable to mate with said array and wherein said second plate is operable to removeably mate with said handler and comprises a second plurality of magnets and orientation features; and distribution features for distributing pneumatic pressure to each cylinder component of said array.

12. The pick and place test head of claim 11 wherein each cylinder component of said array further comprises:

a pneumatically controlled piston; and a suction cup coupled to one end of said piston, said suction cup for attaching to and securing said integrated circuit device under test.

13. A pick and place test head comprising:

a block unit configured to mate with a test system handler, the block unit having a first interface area comprising a recessed collar; and a removeable cylinder component having a second interface area separable from the first interface area, the second interface area comprising an extruded collar, the removeable cylinder component configured to removeably mate with said block unit and configured to securely retain a device under test, wherein the removeable cylinder component is magnetically attached to the block unit.

14. The pick and place test head of claim 13 wherein said removeable cylinder component is configured to rotate into a locking configuration secured by a feature of said block unit.

15. The pick and place test head of claim 13 wherein both the block unit and the removeable cylinder component comprise retention magnets.

16. The pick and place test head of claim 13 wherein only one of the block unit and the removeable cylinder component comprise retention magnets.

17. A pick and place test head system comprising:

a block component;

a first cylinder component configured to be removed from the block component using manual force and without using tools; and a second cylinder component configured to be attached to the block component using manual force and without using tools, the second cylinder component comprising a piston that is pneumatically controlled and concentric with the first cylinder component.

18. The system of claim 17 wherein removing said first cylinder component comprises rotating said first cylinder component.

19. The system of claim 17 wherein attaching said second cylinder component comprises rotating said second cylinder component into a locking position on the block component.

20. The system of claim 17 wherein the second cylinder component is configured to attach to and pick up a device under test (DUT).

* * * * *